(12) United States Patent
Li et al.

(10) Patent No.: US 7,274,689 B2
(45) Date of Patent: Sep. 25, 2007

(54) PACKET SWITCH WITH ONE-STOP BUFFER IN MEMORY WITH MASSIVE PARALLEL ACCESS

(75) Inventors: Shuo-Yen Robert Li, Shatin (HK); Jian Zhu, Shenzhen (CN)

(73) Assignee: Industrial Technology Research Institute, Hsinchu (TW)

( * ) Notice: Subject to any disclaimer, the term of this patent is extended or adjusted under 35 U.S.C. 154(b) by 1135 days.

(21) Appl. No.: 09/882,760

(22) Filed: Jun. 15, 2001

(65) Prior Publication Data

US 2002/0012356 A1 Jan. 31, 2002

Related U.S. Application Data

(60) Provisional application No. 60/212,333, filed on Jun. 16, 2000.

(51) Int. Cl.
*H04L 12/50* (2006.01)
(52) U.S. Cl. ............ 370/358; 370/375; 370/378; 370/423
(58) Field of Classification Search ........ 370/366, 370/367, 368, 360, 389, 386, 423, 422, 387, 370/358, 375, 376, 378
See application file for complete search history.

(56) References Cited

U.S. PATENT DOCUMENTS

| | | | |
|---|---|---|---|
| 4,523,273 A | 6/1985 | Adams et al. | |
| 4,623,996 A * | 11/1986 | McMillen | 370/418 |
| 4,852,091 A | 7/1989 | Li | |
| 4,899,334 A | 2/1990 | Shimizu | |
| 4,905,225 A | 2/1990 | Francois et al. | |
| 4,945,534 A | 7/1990 | Driscoll et al. | |
| 4,955,017 A * | 9/1990 | Eng et al. | 370/230 |
| 4,970,507 A | 11/1990 | Cooperman et al. | |
| 4,991,168 A * | 2/1991 | Richards | 370/381 |
| 5,123,011 A | 6/1992 | Hein et al. | |
| 5,148,428 A * | 9/1992 | Lee | 370/411 |
| 5,166,926 A | 11/1992 | Cisneros et al. | |
| 5,184,346 A | 2/1993 | Kozaki et al. | |
| 5,216,668 A | 6/1993 | Zhang | |
| 5,276,425 A * | 1/1994 | Swanson et al. | 340/2.22 |
| 5,299,317 A | 3/1994 | Chen et al. | |
| 5,303,383 A | 4/1994 | Neches et al. | |
| 5,353,283 A | 10/1994 | Tsuchiya | |
| 5,367,518 A | 11/1994 | Newman | |
| 5,367,520 A | 11/1994 | Cordell | |
| 5,369,635 A | 11/1994 | Gandini et al. | |
| 5,371,495 A | 12/1994 | Sturges et al. | |

(Continued)

OTHER PUBLICATIONS

A shared buffer memory switch for an ATM, by Kuwahara et al., Proceedings of ICC, Boston, vol. 1, pp. 118-122, 1989.

*Primary Examiner*—Wing Chan
*Assistant Examiner*—Andrew C. Lee
(74) *Attorney, Agent, or Firm*—Akin Gump Strauss Hauer & Feld LLP

(57) ABSTRACT

A broadband packet switch that handles all packets that arrive within the same frame time by simultaneously bit-pipelining the packets into different sections of the one-stop packet buffer through an input switch. Each packet remains in is selected section until its eventual exit from the buffer through an output switch. Access to the memory storage in which the packet buffer resides is not through a memory bus or buses, thereby engendering massive parallel access.

24 Claims, 7 Drawing Sheets

U.S. PATENT DOCUMENTS

| | | | |
|---|---|---|---|
| 5,396,231 A | | 3/1995 | Hein |
| 5,426,733 A | | 6/1995 | Masui |
| 5,450,074 A | * | 9/1995 | Yoshifuji ................... 340/2.22 |
| 5,451,936 A | | 9/1995 | Yang et al. |
| 5,471,628 A | | 11/1995 | Phillips et al. |
| 5,475,383 A | * | 12/1995 | Ohta et al. .................. 370/382 |
| 5,483,541 A | | 1/1996 | Linsky |
| 5,500,858 A | | 3/1996 | McKeown |
| 5,506,840 A | | 4/1996 | Pauwels et al. |
| 5,517,495 A | | 5/1996 | Lund et al. |
| 5,541,914 A | | 7/1996 | Krishnamoorthy et al. |
| 5,566,179 A | | 10/1996 | Kobayashi et al. |
| 5,568,477 A | | 10/1996 | Galand et al. |
| 5,583,861 A | * | 12/1996 | Holden ................. 370/395.42 |
| 5,600,630 A | | 2/1997 | Takano et al. |
| 5,602,844 A | | 2/1997 | Lyles |
| 5,623,698 A | * | 4/1997 | Stephenson et al. .......... 710/38 |
| 5,671,222 A | | 9/1997 | Chen et al. |
| 5,689,505 A | | 11/1997 | Chiussi et al. |
| 5,689,506 A | | 11/1997 | Chiussi et al. |
| 5,724,349 A | | 3/1998 | Cloonan et al. |
| 5,724,351 A | | 3/1998 | Chao et al. |
| 5,754,120 A | * | 5/1998 | Argentati ................... 340/2.22 |
| 5,768,270 A | | 6/1998 | Ha-Duong |
| 5,801,641 A | * | 9/1998 | Yang et al. ................ 340/2.22 |
| 5,802,052 A | | 9/1998 | Venkataraman |
| 5,809,021 A | | 9/1998 | Diaz et al. |
| 5,841,775 A | | 11/1998 | Huang |
| 5,852,407 A | | 12/1998 | Ishii et al. |
| 5,859,846 A | | 1/1999 | Kim et al. |
| 5,896,371 A | | 4/1999 | Kobayashi et al. |
| 5,940,389 A | | 8/1999 | Yang et al. |
| 5,949,778 A | | 9/1999 | Abu-Amara et al. |
| 5,963,554 A | | 10/1999 | Song |
| 5,987,028 A | | 11/1999 | Yang et al. |
| 6,052,373 A | | 4/2000 | Lau |
| 6,058,112 A | | 5/2000 | Kerstein et al. |
| 6,067,298 A | * | 5/2000 | Shinohara .............. 370/395.71 |
| 6,081,512 A | | 6/2000 | Muller et al. |
| 6,157,643 A | | 12/2000 | Ma |
| 6,160,806 A | | 12/2000 | Cantwell et al. |
| 6,215,786 B1 | | 4/2001 | Larson et al. |
| 6,219,349 B1 | | 4/2001 | Kobayashi et al. |
| 6,259,699 B1 | | 7/2001 | Opalka et al. |
| 6,307,854 B1 | | 10/2001 | Webb |
| 6,335,930 B1 | | 1/2002 | Lee |
| 6,370,155 B1 | | 4/2002 | Cantwell et al. |
| 6,400,708 B1 | | 6/2002 | Bartholomew et al. |
| 6,427,037 B1 | | 7/2002 | Okayama |
| 6,473,827 B2 | | 10/2002 | McMillen et al. |
| 6,477,174 B1 | * | 11/2002 | Dooley et al. .............. 370/416 |
| 6,493,347 B2 | | 12/2002 | Sindhu et al. |
| 6,553,031 B1 | | 4/2003 | Nakamura et al. |
| 6,556,725 B1 | | 4/2003 | Kondo et al. |
| 6,563,819 B1 | | 5/2003 | Park |
| 6,563,837 B2 | * | 5/2003 | Krishna et al. ............. 370/413 |
| 6,600,741 B1 | | 7/2003 | Chrin et al. |
| 6,611,519 B1 | | 8/2003 | Howe |
| 6,611,527 B1 | * | 8/2003 | Moriwaki et al. .......... 370/412 |
| 6,621,828 B1 | | 9/2003 | Field et al. |
| 6,628,651 B1 | | 9/2003 | Ryan et al. |
| 6,629,147 B1 | * | 9/2003 | Grow ........................ 709/236 |
| 6,647,017 B1 | | 11/2003 | Heimann |
| 6,657,998 B2 | | 12/2003 | Li |
| 6,714,562 B1 | | 3/2004 | Calvignac et al. |
| 6,721,324 B1 | | 4/2004 | Shinohara |
| 6,735,203 B1 | * | 5/2004 | Heiman ..................... 370/394 |
| 6,747,971 B1 | | 6/2004 | Hughes et al. |
| 6,754,449 B2 | * | 6/2004 | Chang et al. ................. 398/51 |
| 6,757,281 B1 | | 6/2004 | Irish |
| 6,757,282 B1 | | 6/2004 | Ofek |
| 6,798,777 B1 | | 9/2004 | Ferguson et al. |
| 6,819,821 B2 | * | 11/2004 | Lacey et al. .................. 385/17 |
| 6,829,237 B2 | | 12/2004 | Carson et al. |
| 6,834,038 B1 | | 12/2004 | Zelig et al. |
| 6,850,524 B1 | | 2/2005 | Troxel et al. |
| 6,931,002 B1 | * | 8/2005 | Simpkins et al. ........... 370/354 |
| 6,999,677 B2 | * | 2/2006 | Graves et al. ................. 398/5 |
| 2002/0018475 A1 | | 2/2002 | Ofek et al. |
| 2002/0031124 A1 | | 3/2002 | Li |
| 2002/0176526 A1 | | 11/2002 | Mejia |

* cited by examiner

PACKET SWITCH WITH ONE-STOP BUFFER IN MEMORY WITH MASSIVE PARALLEL ACCESS

CROSS-REFERENCE TO RELATED APPLICATION

This application is a non-provisional application of provisional application Ser. No. 60/212,333 filed Jun. 16, 2000.

BACKGROUND OF THE DISCLOSURE

1. Field of the Invention

The present invention relates to a packet switch and, more particularly, to architectures and control methods for a switch wherein packets are pipelined in serial bits into and out of a one-stop packet buffer residing in a memory storage that allows massive parallel access.

2. Description of the Background Art

Buffer memory is commonly employed in packet switches to relieve the packet loss due to collisions of packets, e.g., packets bound for the same output within the same time interval. There have been different strategies in the deployment of the packet buffer memory to mitigate such occurrences, such as output buffering, crosspoint buffering, and input buffering. For discussion purposes below, it is convenient to visualize a representative format for a conventional packet as a data unit having overall fixed length (a specified number of bits or bytes) and being composed of a data payload preceded by a switching header. The switching header indicates the intended output address(es) as well as the QoS (Quality of Service) classification of the packet. In case the packet is merely an idle expression, both the switching header and the payload are, for example, strings of '0' bits.

In particular, output buffering deploys a packet buffer associated with each output address, called an "output buffer". Inside an output buffer is a packet queue. Normally in output-buffer switching architecture, each output buffer is allocated a separate block of the memory storage and the block is partitioned into a fixed number of registers, each for holding a packet. On the other hand, the length of the packet queue inside the buffer is dynamically changing. When all registers in the output buffer are occupied, further packets entering the buffer will be blocked. Blocking of one output buffer may occur even though other output buffers associated with other output addresses are not full.

The "shared-buffer-memory" style of switching architecture addresses this problem by allowing all packet queues (each corresponding to an output) to dynamically share a large pool of registers. This sharing necessitates the access of the memory storage by multiple sources, wherein a source here means an input port receiving input packets. The straightforward implementation of such multiple access to the memory storage is by a "bus" time-shared among sources, i.e., each input port transmits data at a different time slot; the time-division multiplexing of the incoming packets from input ports to the bus is performed by a packet multiplexer. Thus the transmission over the bus and the memory intake must be at the bit rate M times higher than the bit rate of a single input, where M is the number of inputs. They are normally in 16, 32, or 64 parallel bits, with each bit over a separate wire, because of the technological limitations on the bandwidth over a single wire. Concomitantly the packet multiplexer must also perform the serial-to-parallel conversion of the packet format. Symmetrically, at the output end, a packet demultiplexer demultiplexes packets from the shared buffer memory through another parallel-bit bus to output ports and performs the parallel-to-serial conversion of the packet format.

The throughput of a shared-buffer-memory switch is limited by the bandwidth of the memory bus, which is potentially also a single point of failure. Therefore, the shared-buffer-memory style of switching architecture does not scale well for large number of broadband I/O ports. A new architecture of a shared-buffer-memory switch that can scale well is a necessity for high-throughput applications. Meanwhile, it would be especially advantageous to save the cost in the memory-bus operations of multiplexing, demultiplexing, serial-to-parallel conversion, and parallel-to-serial conversion.

A "one-stop buffer" is a component known in the art which, in the context of a packet switch, means a packet buffer such that whenever a packet occupies a certain section, e.g., a register, in the buffer, it remains in that section until its eventual exit from the switch. One-stop buffering is desirable in packet switching because moving buffered packets around in real time is a costly operation as alluded to above. The subject matter of the present invention relates to a one-stop buffer.

SUMMARY OF THE INVENTION

Certain limitations and shortcomings of the aforementioned devices and components are obviated in accordance with the present invention wherein a broadband packet switch handles all packets that arrive within the same frame time by simultaneously bit-pipelining the packets into different sections of a one-stop packet buffer through an input module. Each packet remains in its selected section until its eventual exit from the buffer through an output module.

In accordance with a broad system aspect of the present invention, an M×N packet switch for switching M input packets arriving in each of a sequence of frame times to N output ports, includes: (a) an input module, having M inputs and B outputs, B>M, for switching the M input packets to M of the B outputs to produce M switched packets during each of the frame times; (b) a packet buffer including B registers, coupled to the input module, for storing the M switched packets into M available registers during each of the frame times to produce M stored packets; and (c) an output module, having B inputs and N outputs coupled to the packet buffer, for transferring up to N packets from occupied registers in each of the frame times to the output ports based upon destination addresses contained within each of the stored packets.

Features of the subject matter in accordance with the present invention include: (1) the access to the memory storage in which the packet buffer resides is not through a memory bus or buses. A memory bus would allow the access at one address at a time, while the memory storage adopted in this invention allows massive parallel access; (b) the access to the memory storage also does not require multiplexing and/or demultiplexing. The pipelining of packets is in serial bits throughout, hence there is no need of serial-to-parallel conversion of the packet format; and (c) the scale of this new architecture is directly limited by neither the bus bandwidth nor the memory bandwidth in the prevailing technology of generic components.

BRIEF DESCRIPTION OF THE DRAWINGS

To facilitate understanding, identical reference numerals have been used, where possible, to designate identical elements that are common to the figures.

DETAILED DESCRIPTION

1. Overall Architecture

Figure 1:
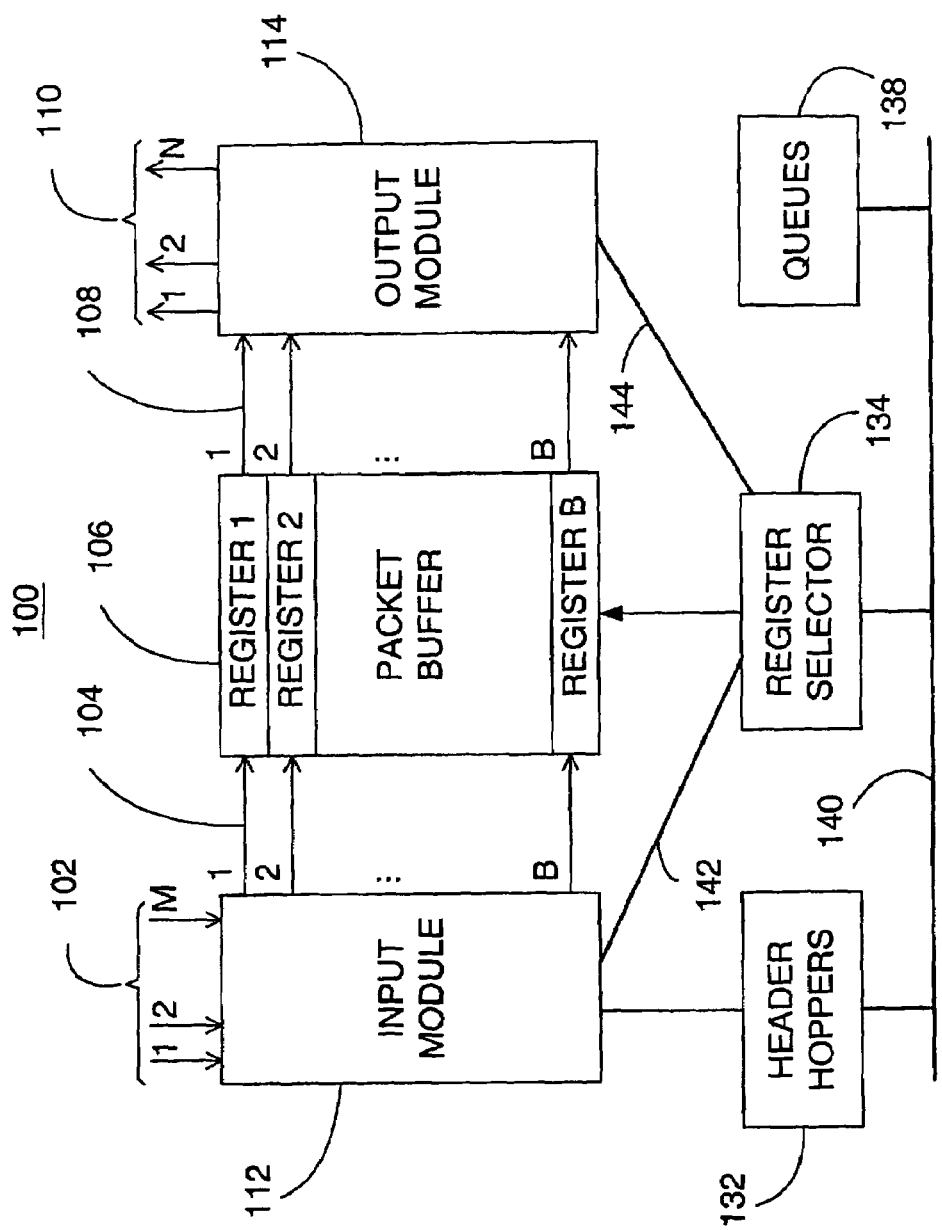
FIG. 1 is a block diagram of the architecture of the packet switch according to the present invention.

Block diagram 100 of FIG. 1 depicts an architecture of an M×N packet switch (i.e., a switch with M inputs and N outputs) in accordance with the present invention. There are three switching components that handle complete packets, as follows: (a) packet buffer 106, (b) input module 112, and (c) output module 114.

There are four additional components for the switching control: (i) header hoppers 132 for the M inputs, (ii) queues 138 for the N outputs, (iii) register selector 134, and (iv) communication medium 140 coupling control components. These components are interrelated to one another and also to the three switching components.

Figures 2A, 2B:
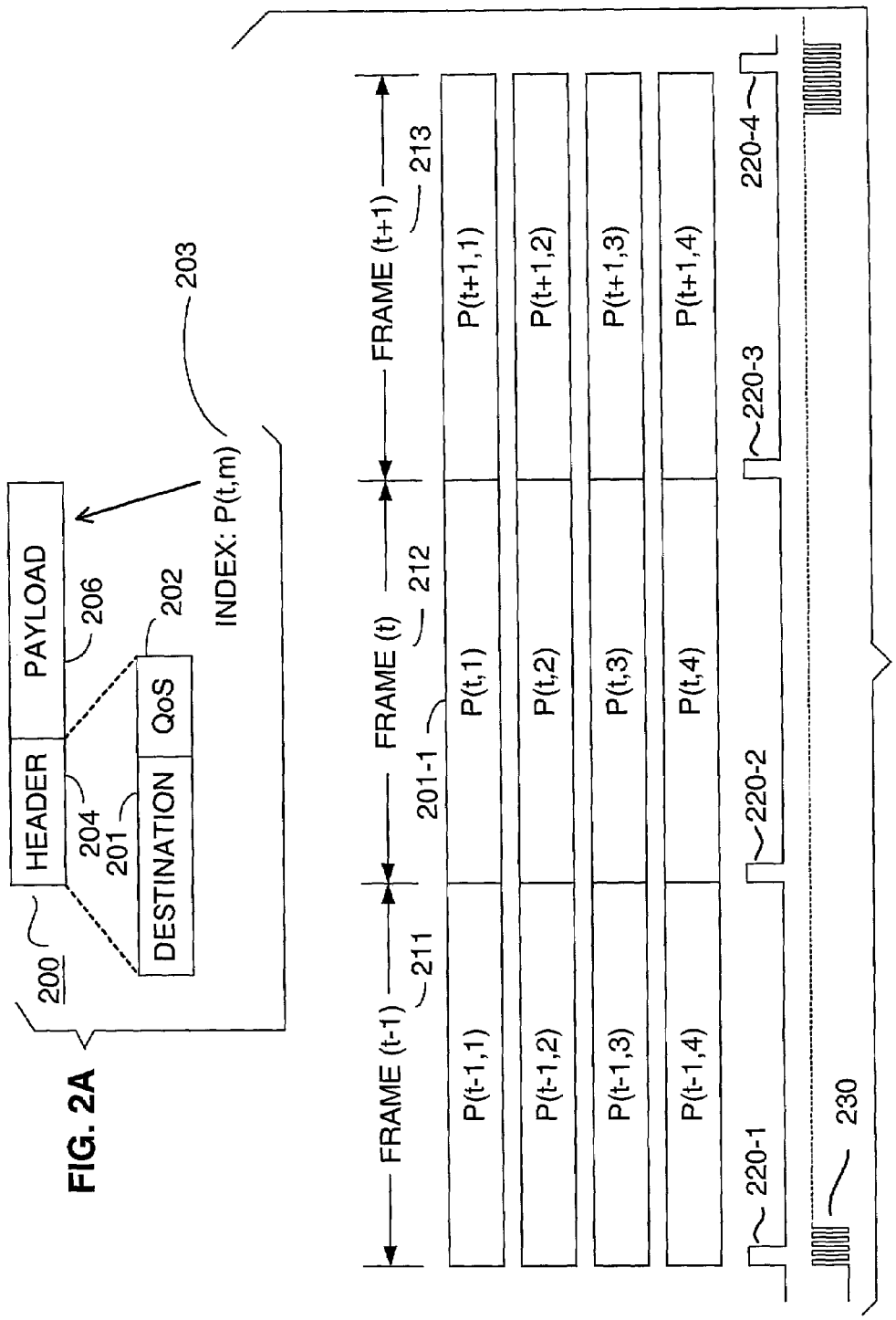
FIG. 2A is a block diagram of the format of a packet entering the packet switch of FIG. 1.
FIG. 2B depicts a number of packet streams to be switched by the packet switch of FIG. 1.

Each component is now described in detail along with its relationship to the other components; reference is made to packet 200 in FIG. 2A and the frames of FIG. 2B while describing the components. A packet is, essentially, a data unit in serial bits having an overall fixed length and is composed of a payload 206 preceded by a switching header 204. The switching header indicates the intended output address(es) (DESTINATION having reference numeral 201) as well as the QoS classification of the packet (reference numeral 202). In case the packet is merely an idle expression, both the switching header and the payload are, e.g., strings of '0' bits.

Packets appear at the M input leads of inputs 102 in synchronized frames. FIG. 2B depicts, for example, four individual packet streams appearing on each of M=4 inputs in the frames t−1, t, and t+1 (reference numerals 211, 212, and 213, respectively). To be specific without loss of generality, a packet in FIGS. 2A and 2B is indexed as follows: P(t,m) (see reference numeral 203 in FIG. 2A for an arbitrary packet), where t points to the t-th frame and m (=1, 2, . . . , M) specifies the input lead. For instance, the packet in frame 212 arriving on the third lead of inputs 102 is P(t,3); similarly, the packet in frame 213 arriving on the fourth lead of inputs 102 is P(t+1,4).

Frames are synchronized, for example, by the sequence of frame timing pulses 220-1, 220-2, 220-3, 220-4, . . . for the parallel packet streams. Moreover, there is an associated stream of bit-clock signals 230 to time the bit pipelining through the packet switch 100. The relation between the frame clock manifested by pulses 220-1, . . . and bit-clock signals 230 is shown in the bottom portion of FIG. 2B.

Packet Buffer 106

Packet buffer 106 is partitioned into a number of, say, B registers, each of the registers being used to hold a packet in the serial-bit format. Each register is identified by an identifier, called the register address. As a simple shorthand, Register 1 will refer to the register at the register address 1, Register 2 to the one at the register address 2, and so on. Associated with each register, there is an input lead 104 to packet buffer 106 and also an output lead 108. The identifier of an input/output lead is the register address of its associated register. All B registers operate individually and all can be accessed concurrently under the control of a master clock, which is of any conventional design. Packet buffer 106 is a one-stop packet buffer. That is, each arriving packet occupies a register in the buffer and remains in that register until it is sent onward to destination outputs via output module 114.

Input Module 112

Input module 112 is an M×B switch. Each of its M inputs receives an input from one of the leads comprising inputs 102 of packet switch 100, and each of its B outputs couples to one of the B registers in the packet buffer 106. In every frame time, a packet enters a pre-selected register in packet buffer 106 through the input module 112. Thus exactly M packets, including possibly idle expressions, enter M different registers in packet buffer 106 simultaneously in every frame time.

Header Hoppers 132

Corresponding to each of the M inputs, there is one header hopper within the set of header hoppers 132. Through communication medium 140 coupling control components 132, 134, and 138, each hopper in header hoppers 132 receives from register selector 134 a register address pre-assigned to the hopper for the particular packet frame. Upon the arrival of new packets at the switch, every header hopper also receives from its corresponding input the switching header 204 of the newly arrived packet; this reception may possibly be through the input module 112 depending on the detailed design. Switching header 204 contains the destination address(es) and the QoS classification of the packet. Each hopper in header hoppers 132 then transmits the register address and the QoS classification to the queues 138 corresponding to each destination address of the newly arrived packet; this transmission is through the communication medium 140 among control components. In the case when a packet is merely an idle expression, there is no intended destination address.

Output Module 114

Output module 114 is a B×N switch. Each of its B inputs is to receive data from one of the B registers in packet buffer 106, and each of its N outputs comprises one of the outputs in outputs 110 of packet switch 100. In every frame time, register selector 134 selects at most one buffered packet to be transmitted to each output in outputs 110 through output module 114 if required. It is possible that a buffered packet may be selected for the simultaneous transmission to a plurality of outputs in outputs 110. This happens when the same register address of that packet is at the front of a plurality of queues. On the other hand, a buffered packet destined for multiple addresses may be transmitted to different outputs during different frames.

Queues 138

Corresponding to each of the N outputs is a queue in queues 138. A particular queue receives, from one hopper in header hoppers 132, the register address and the QoS classification of a newly arrived packet destined for the output corresponding to the particular queue. In every frame time each queue receives such information of at most one packet from each of the M hoppers in header hoppers 132, and when a plurality of packets destined to one destination output arrive in a frame time the register addresses of these packets will enter the queue associated with that destination output. In any case, the transmission of the register addresses is via communication medium 140 among control components. The register address enters the queue associated with every destination address of the packet, and the QoS classification is used in the priority treatment in the queueing discipline. It is emphasized here that an entry in the queue holds only the register address of a packet but not the packet itself. Moreover, in particular, if $N_2$ equals the number of non-empty queues in a frame time, and $N_1$ equals the number of distinct addresses in the $N_2$ addresses at the front of these $N_2$ non-empty queues, then $N_1$ packets are transferred from occupied registers in each of the frame times to $N_2$ output ports indicated by identifiers of queues, $N_1 \leq N_2 \leq N$.

Register Selector 134

Register selector 134 controls the switching function inside input module 112 and output module 114 via control paths 142 and 144, respectively. In every frame time, register selector 134 selects at most one buffered packet to be transmitted to each of the output leads of outputs 110 through the output module 114. Register selector 134 also keeps track of the set of destination address(es) that every buffered packet has yet to be transmitted to. When the set becomes empty, the packet can be deleted from the buffer and hence its register address becomes "available" for incoming packets.

Prior to the arrival of a parallel stream of packets to inputs 102 (for example, during the (t−1)-th frame for the t-th next incoming frame), register selector 134 pre-selects an available register in packet buffer 106 for a packet to arrive through each of the M inputs 102 to input module 112. In case there are less than M available registers to select from, depending on the detailed design, register selector 134 may or may not force occupied registers into availability. Register selector 134 also transmits the register address of the selected register to one of the hoppers in header hoppers 132 corresponding to the inputs 102; this transmission may be possibly through the input module 112 depending on the detailed design.

Communication Medium 140 Interconnecting Control Components

"Users" of communication medium 140 are the control components, including header hoppers 132, queues 138, and register selector 134. The straightforward implementation of the communication medium is a multi-user bus where different users may inject data into the bus at different times.

Example of Architecture 100

Figure 3:
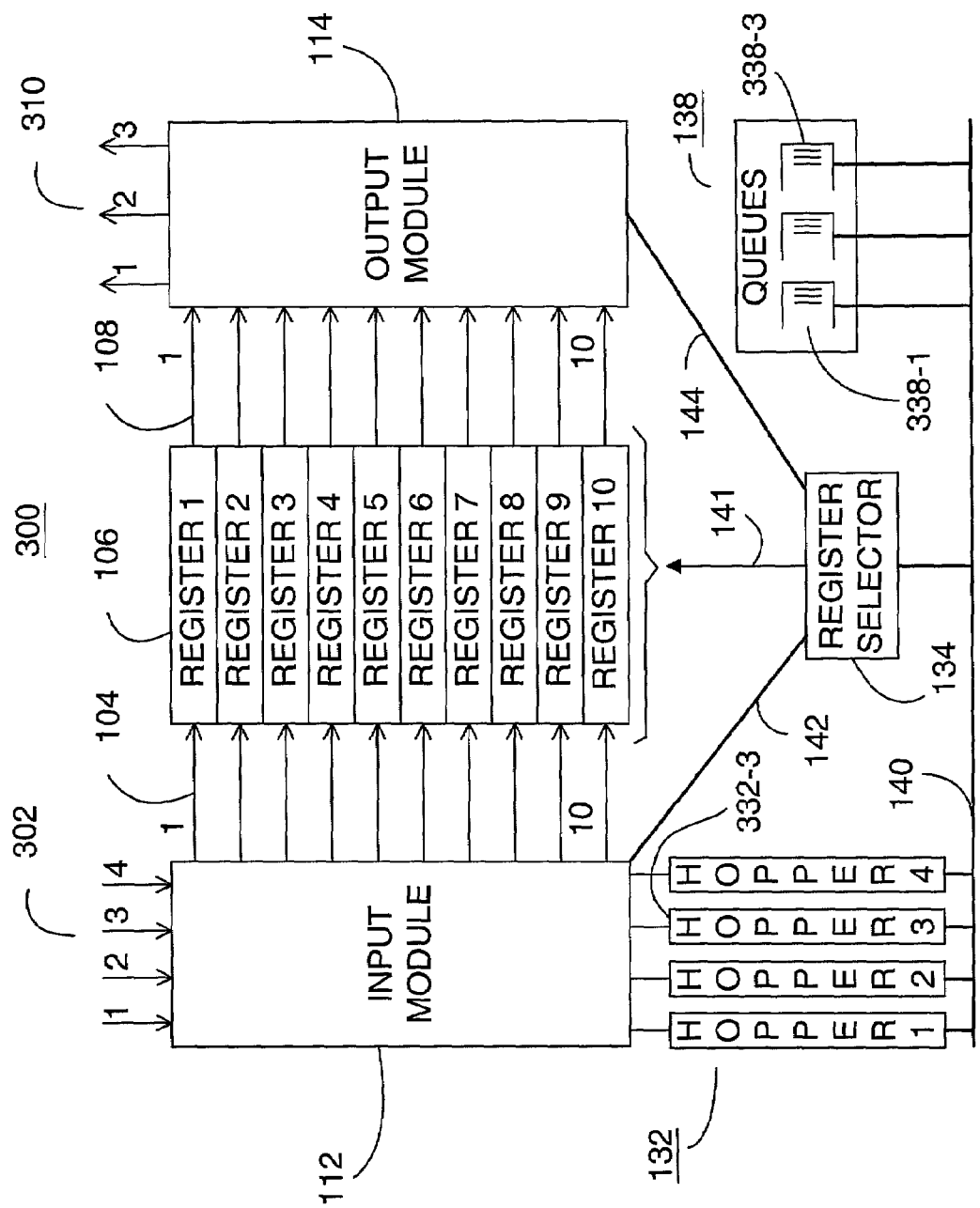
FIG. 3 is a block diagram of the architecture of the packet switch with 4 input ports, 3 output ports, and a 10-register packet buffer according to the present invention.

FIG. 3 shows the architecture of a 4×3 packet switch with a 10-register packet buffer 106 according to the present invention. Consider the processing of, say, the third packet P(t,3) in frame 212 of FIG. 2B. Prior to the arrival of this packet in frame 212, it is supposed that Register 9 is available for assignment as determined by register selector 134 in frame 211. The identity of Register 9, i.e., the numerical value "9", is conveyed to hopper 332-3 in frame 211 as being the register able to accept the third packet in the next frame 212. Upon the arrival of new packets in frame 212, register selector 134, via path 142, signals input module 112 to switch the third incoming packet to Register 9, that is, the packet arriving on lead "3" of input 302 is bit-pipelined into Register 9 using bit clock 230 during frame 212. Moreover, the header from this third packet is conveyed to hopper 332-3 via input module 112; an illustrative manner of accomplishing this will be discussed shortly. Incidentally, input module 112 may be, for example, a conventional 4×10 crossbar switch.

Suppose that this third packet is destined only for output lead "1" of outputs 310 as determined from the header of the third packet. Then, the register address "9" along with QoS information is passed from hopper 332-3, via communication medium 140 under control of hopper 332-3, to queue 338-1, namely, the queue in queues 138 which handles output lead "1". Suppose further that the QoS information determines to put this third packet at the front of queue 338-1, or more explicitly, enters the register address "9" into the front entry of the queue. Thus this third packet, which is in the process of becoming the contents of Register 9, will be the next packet to be passed from packet buffer 106 to output lead "1" via output module 310 because it is at the front of queue 338-1. Register selector 134, after queues 138 have been filled by hoppers 132 in frame 212, keeps track of which packets are ready for delivery to outputs 310 in the next round of operation of output module 114. Incidentally, output module 114 may be, for example, a conventional 10×3 crossbar switch.

The next round of operation of output module 114 starts at some point within the current frame 212 and may possibly be before the packet 3 has wholly entered Register 9. Register selector 134, via path 144, informs output module 114 of the manner of switching between inputs and outputs so as to deliver the requisite packets. Once output module 114 is set up, the next round of operation of output module 114 starts and contents of Register 9 starts to be bit-pipelined through output module 114 to the output lead "1" using bit clock 230. Other packets are being bit-pipelined through output module 114 synchronously with the third packet, as determined by the state of queues 138 and register selector 134. Register 9 now becomes available, and can be reassigned by packet selector 134 in frame 213. It is possible for packet 3 to be still in the process of exiting Register 9 when a new packet starts to enter the same register at the beginning of frame 213.

By way of expanding the above example, now suppose that the third packet has been destined for more than one output, say output "3" in addition to output "1". Then hopper 332-3 passes this information along with the fact that Register 9 is to store incoming packet 3, to queues 338-1 and 338-3, respectively, during frame 212. Suppose there is a higher priority packet based on its QoS in queue 338-3 so that the third packet cannot be emitted during the next round of operation of output module 114, but rather is delayed until a succeeding frame. Then, during frame 212, the contents of Register 9 starts to be emitted to output lead "1" of outputs 310 via output module 114 under control of register selector 134. Now, because the third packet must still be delivered to output lead "3", Register 9 is not yet available for reassignment. If the third packet is next to the head of the queue 338-3 during frame 212 and at the head during frame 213, then the third packet can start to be emitted during the frame 213. Once emitted, then Register 9 is available for reassignment.

One illustrative manner of keeping track of the processing of register contents by register selector 134 is with a so-called "assignment table", illustrated as below. Table 1 represents the situation wherein the third packet is destined for the two outputs on leads "1" and "3", which is the status prior to the output operation in frame 212; as seen in Table 1, Output 1 and Output 3 are marked as being "active". As then postulated by the expanded example, before the end of frame 212, the contents of Register 9 have started to be passed to lead "1", so Output 1 can be marked as "cleared", as shown in Table 2. Finally, after Register 9 starts to deliver its contents to lead "3" in frame 213, then Output 3 can be marked as "cleared", meaning that Register 9 is now ready for reassignment.

TABLE 1

| Register | Output 1 | Output 2 | Output 3 | Output 4 |
|---|---|---|---|---|
| 1 | | | | |
| ... | | | | |
| 9 | Active | | Active | |
| ... | | | | |

TABLE 2

| Register | Output 1 | Output 2 | Output 3 | Output 4 |
|---|---|---|---|---|
| 1 | | | | |
| ... | | | | |
| 9 | Cleared | | Active | |
| ... | | | | |

Operational Flow

By way of reiteration for the general case based upon the Example and with reference to FIG. 1, in every frame time, each inputs 102 of the switch receives a packet in serial-bit pipelining, and the packet arrival at all inputs is synchronous. The handling of one batch of packets that arrive in a frame time includes certain setup operations in the preceding frame time, the writing of the packets into packet buffer 106 upon the arrival of packets, and the routing operations of these packets from packet buffer 106 to their intended output ports 110 in subsequent frame times. The steps of these operations are described as follows:

1. In a frame time before the arrival of packets, register selector 134 selects an available register in packet buffer 106 for each of the M inputs.
2. The register selector 134 setups the switch of the input module 112. Register selector 134 also transmits the register address of the selected register to header hoppers 132 corresponding to inputs 102.
3. The switching connections inside the input module 112 are set up via path 141.
4. M packets arrive at packet switch 100. Each of them is written into a different register in packet buffer 106 through input module 112. Meanwhile switching header 204 of every incoming packet is also transferred to header hoppers 132 corresponding to input port 102 the packet is arriving through.
5. Each of the header hoppers 132 transmits the register address and the QoS classification to the queues 138 corresponding to each destination address of the newly arrived packet. The transmission is via communication medium 140 interconnecting control components.
6. Queues 138 are updated according to received information.
7. Either the header hoppers or the queues, depending upon the detailed design, send information about the newly arrived packets to the register selector 134 so that the register selector 134 is aware of set of destination address(es) of each new packet.
8. A buffered packet is selected, via path 144, for each destination address from the head of each of the non-queues of queues 138, and transmitted to output ports 110 through output module 114.
9. The register selector 134 is updated with the remaining set of destination address(es) that each transmitted packet has yet to be transmitted to. When the remaining set of a transmitted packet becomes empty, the register address of the packet is declared "available" by register selector 134 so that the register joins the pool of other available registers for storing future packets.

Since the switching architecture is intended for broadband applications, distributed switching control through massive parallel processing is achieved. The parameter B can be much larger than M and N. Moreover, any control mechanism is designed to have a time complexity not proportional to B, but rather some lesser proportion (such as $\log_2 B$).

2. Illustrative Embodiment of Input Module 112

Figure 4:
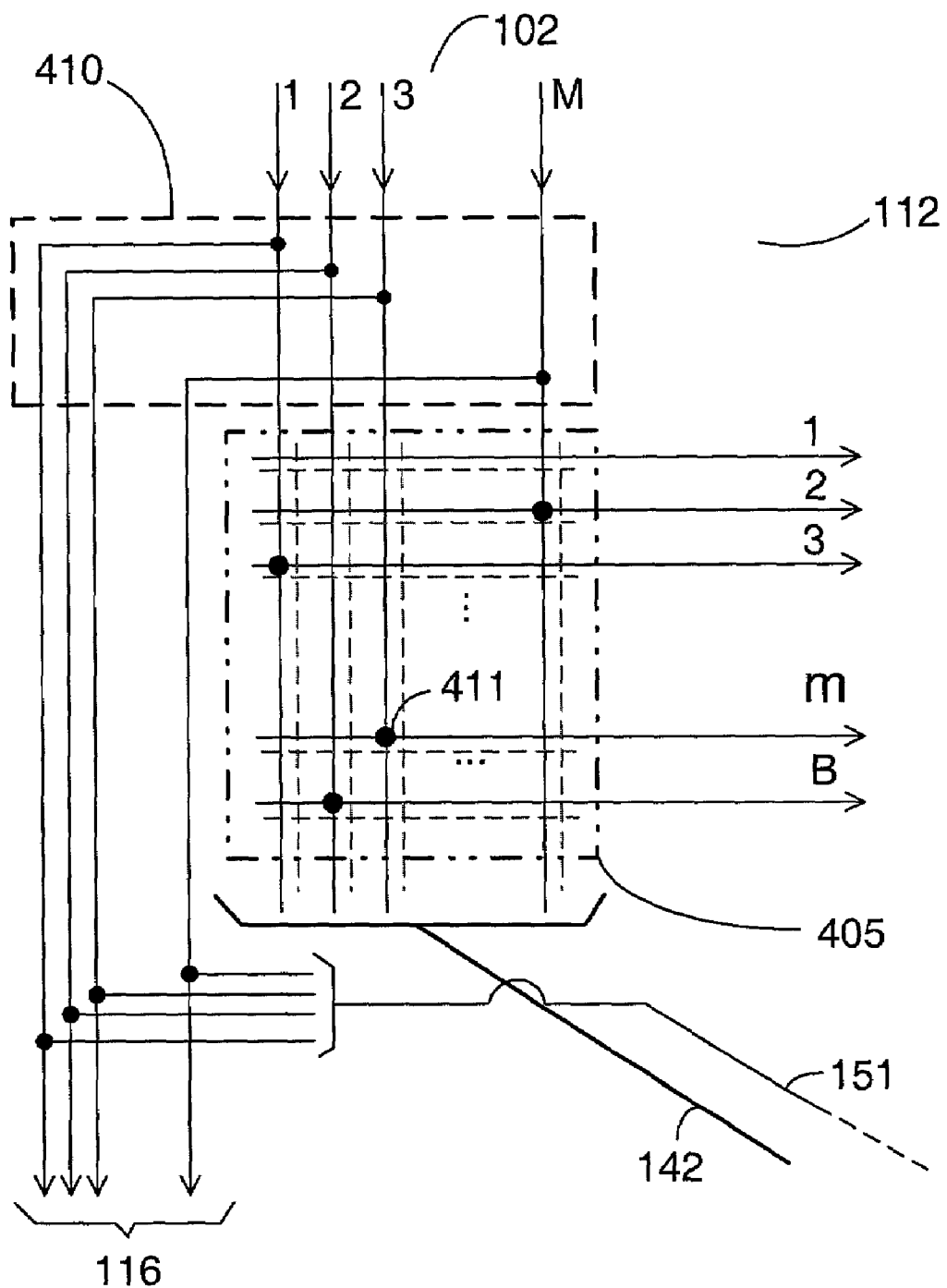
FIG. 4 is a block diagram of the input module of an illustrative design in accordance with the present invention.

FIG. 4 illustrates an implementation of the input module 112, which comprises an M×B crossbar switch 405 for forwarding incoming packets to the packet buffer 106. Control signals on path 142 from register selector 134 are used to close M crosspoints after the selection of an available register for each of the M input (closed crosspoint 411 coupling input lead "3" to Register m is shown as exemplary, as set up by crosspoint paths shown by dashed lines). The other crosspoints in the crossbar are open. The header of an incoming packet at an input is written to the corresponding hopper of header hoppers 132 by a branching circuitry 410 via a path among paths 116.

3. Illustrative Embodiment of Output Module 114

Figure 5:
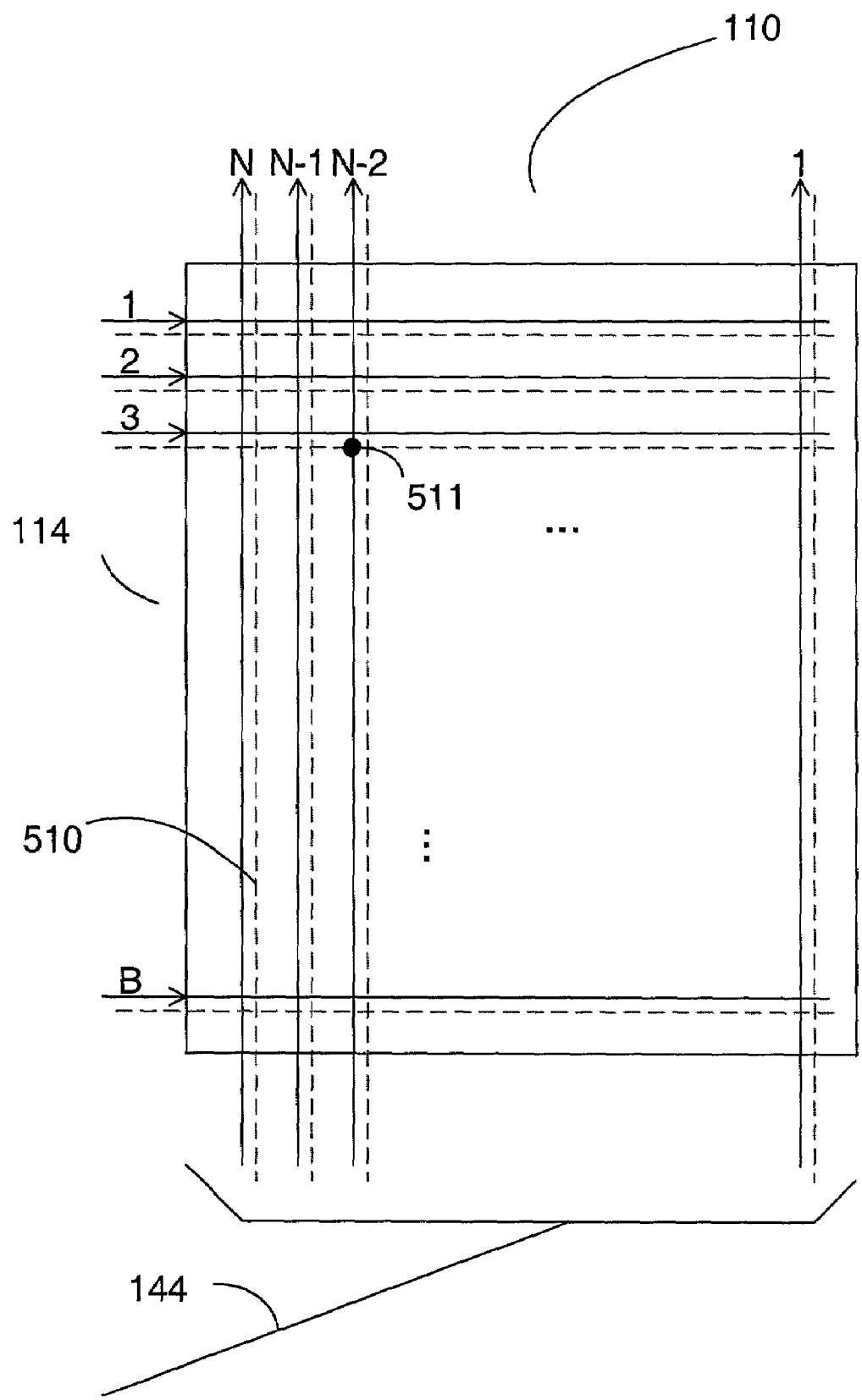
FIG. 5 is a block diagram of the output module of an illustrative design in accordance with the present invention.

FIG. 5 shows an implementation of output module 114 by a B×N crossbar wherein the crosspoints are set up by crosspoint controlling paths (shown dashed) exemplified by reference numeral 510. Control signals on path 144 from register selector 134 are used to close up to N crosspoints to route a set of register contents to the outputs 110 (closed crosspoint 511 coupling input lead "3" to output N-2 is shown as exemplary). The other crosspoints in the crossbar are open.

4. Illustrative Embodiment of Packet Buffer 106

Figure 6:
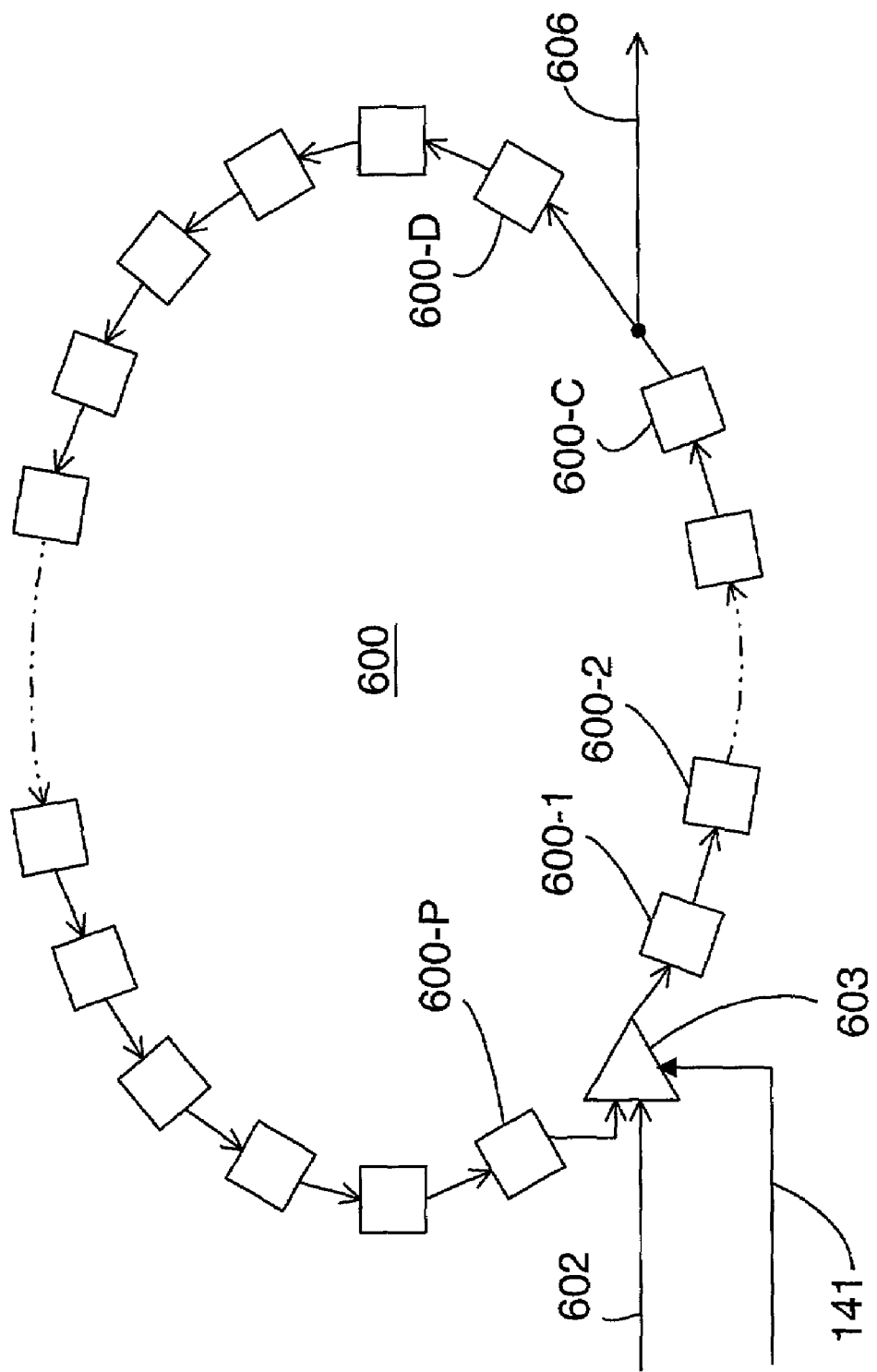
FIG. 6 is a block diagram of a register in the packet buffer in accordance with the present invention.

As shown in FIG. 6, an exemplary register 600 in packet buffer 106 is implemented by a circular chain of bits in a shift-register format which is composed of bit storage devices 600-1, 600-2, . . . , 600-P. In each bit time defined by the master clock, all bits in the chain are shifted to the next bit position in the circular chain. Multiplexer 603, under control of register selector 134 via path 141, decides whether to receive a new incoming packet on lead 602, which is representative of an output from input module 112 or simply to allow the already-stored buffered packet to circle around so the packet remains in the register for the next frame. The shifting bits in the register are also passed to the output module 114 through fan-out 606, which is representative of an input to output module 114. If a packet starts to exit from packet buffer 106 during the same frame of its arrival, it still has to incur the delay in passing through the bit storage devices 600-1 to 600-C. This delay is necessitated by steps 4 to 8 in the Operational Flow.

5. Process Flow Diagram

Figure 7:
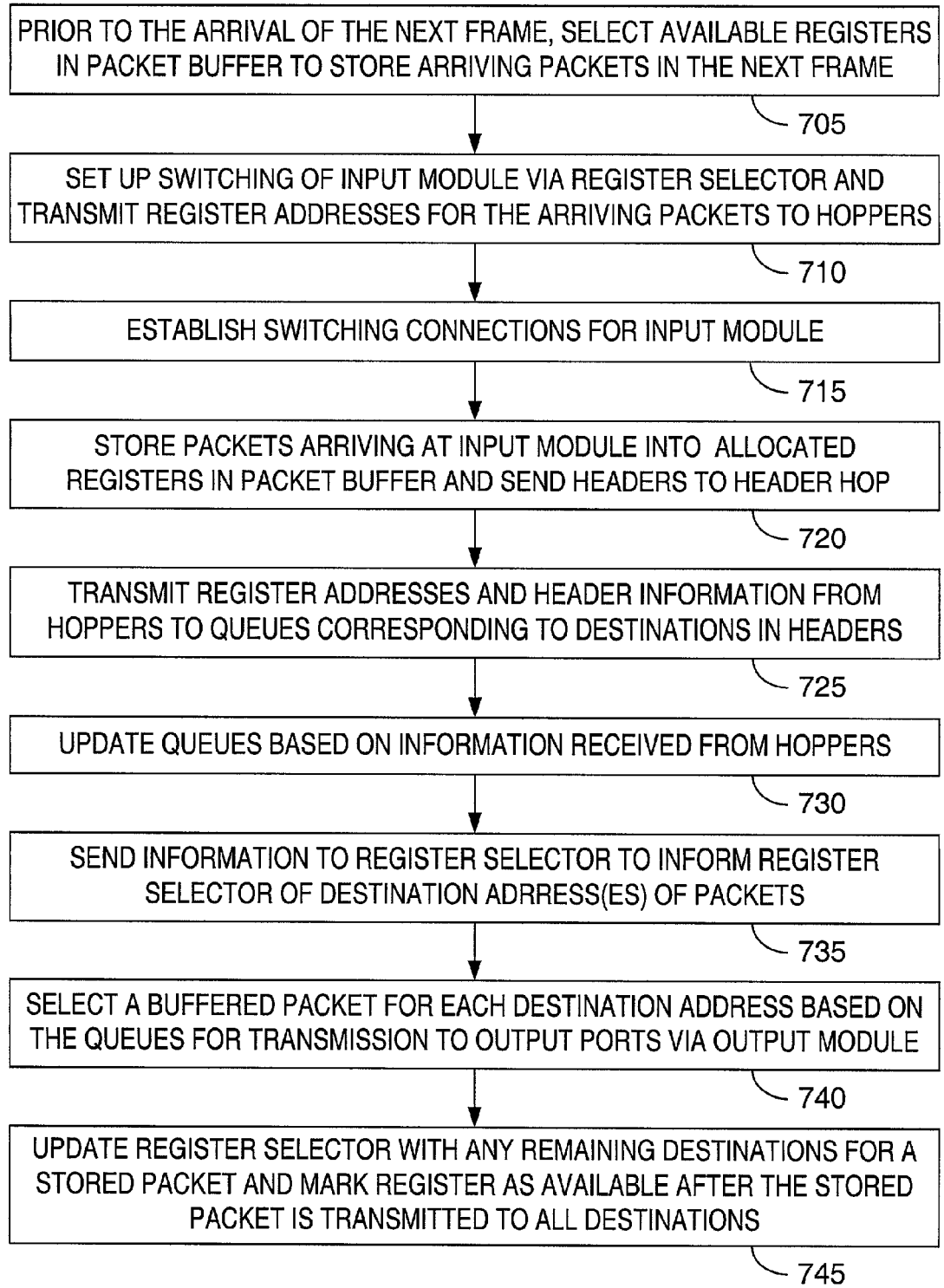
FIG. 7 is a flow diagram of the processing in accordance with the present invention.

The flow diagram of FIG. 7 depicts an illustrative embodiment of the processing effected by the packet switch 100 of FIG. 1; the processing is summarized as follows:

Process 705: prior to the arrival of packets in the next frame, available registers in packet buffer 106 are selected to store the packets arriving in the next frame.

Process 710: set up input module 112 via register selector 134 and transmit the register addresses that are to store the arriving packets to header hoppers 132.

Process 715: establish the switching connections (e.g., the crosspoints) for input module 112.

Process 720: store the packets arriving at input module 112 into allocated registers and send the headers to hoppers 132.

Process 725: transmit the register addresses and header information (e.g., QoS) from hoppers 132 to queues 138 corresponding to the destinations in the headers.

Process 730: update queues 138 based on the register addresses and header information (QoS) received from hoppers 132.

Process 735: send control information to register selector 134 to inform it of destination address(es) of arriving packets.

Process 740: select at most a buffered packet from packet buffer 106 for each destination address based on contents of queues 138 for transmission to outputs 110 via output module 114.

Process 745: update register selector 134 with any remaining destinations for each stored packet and then mark the packet register as available after the stored packet is transmitted to all its destinations.

Although the present invention has been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. An M×N packet switch for switching M input packets arriving in each frame of a sequence of frame times to N output ports, the switch comprising:
    an input module, having M inputs and B outputs, B>M, for switching the M input packets to M of the B outputs to produce M switched packets simultaneously during each frame of said sequence of frame times,
    a packet buffer including B registers, coupled to the input module, for storing the M switched packets into M available registers during each frame of said sequence of frame times to produce M stored packets simultaneously, and
    an output module, having B inputs and N outputs coupled to the packet buffer, for transferring up to N packets from occupied registers in each frame of said sequence of frame times to the output ports simultaneously based upon destination addresses contained within each of the stored packets.

2. The packet switch as recited in claim 1 wherein the input module is an M×B crossbar switch, and the output module is a B×N crossbar switch.

3. The packet switch as recited in claim 1 wherein the packet buffer is a one-stop shared buffer memory.

4. The packet switch as recited in claim 1 further including queues and their identifiers to store the destination addresses and wherein the output module transfers $N_1$ packets from the occupied registers in each of the frame times to $N_2$ output ports indicated by identifiers of the queues, $N_1 \leq N_2 \leq N$.

5. The packet switch as recited in claim 1 further including a register selector for assigning the M of the B registers during each of the frame times to generate M assigned registers.

6. The packet switch as recited in claim 5 further including M header hoppers, coupled to the input module, for storing header information from each of the M input packets in each of the frame times and M addresses of the M assigned registers for the M input packets in each of the frame times.

7. The packet switch as recited in claim 6 further including N queues for storing the addresses of the assigned registers in each of the frame times as transmitted to the N queues from the M header hoppers based upon destination information in the header information of the packets.

8. The packet switch as recited in claim 7 wherein the header hoppers, the register selector, and the queues are coupled via a multi-user bus.

9. The packet switch as recited in claim 1 wherein each of the B registers is a circular shift register.

10. An M×N packet switch for switching M input packets arriving in each frame of a sequence of frame times to N output ports, the switch comprising:
    an M×B input crossbar switch, B>M, for switching the M input packets to M of the B outputs to produce M switched packets simultaneously during each frame of said sequence of frame times
    a one-stop shared buffer memory, including B registers, coupled to the input crossbar switch, for storing the M switched packets into M available registers during each frame of said sequence of frame times to produce M stored packets,
    a B×N output crossbar switch coupled to the packet buffer, for transferring up to N packets from occupied registers in each frame of said sequence of frame times to the output ports simultaneously based upon destination addresses,
    a register selector for assigning the M of the B registers during each frame of said sequence of frame times to generate M assigned registers,
    M header hoppers, coupled to the input crossbar switch, for storing header information from each of the M input packets in each frame of said sequence of frame times and M addresses of the M assigned registers for the M input packets in each frame of said sequence of frame times, and N queues for storing the addresses of the assigned registers in each frame of said sequence of frame times as transmitted to the N queues from the M header hoppers based upon destination information in the header information.

11. The packet switch as recited in claim 10 wherein the header hoppers, the register selector, and the queues are coupled via a multi-user bus.

12. An M×N packet switch for switching M input packets arriving in each frame of a sequence of frame times to N output ports, the switch comprising:
input means, having M inputs and B outputs, B>M, for switching the M input packets to M of the B outputs to produce M switched packets simultaneously during each frame of said sequence of frame times,
storage means, including B registers, coupled to the input module, for storing the M switched packets into M available registers during each frame of said sequence of frame timesto produce M stored packets simultaneously, and
output means, having B inputs and N outputs coupled to the packet buffer, for transferring up to N packets from occupied registers in each frame of said sequence of frame times to the output ports simultaneously based upon destination addresses contained within each of the stored packets.

13. The packet switch as recited in claim 12 wherein the input means is an M×B crossbar switch, and the output means is a B×N crossbar switch.

14. The packet switch as recited in claim 12 wherein the storage means is a one-stop shared buffer memory.

15. The packet switch as recited in claim 12 further including queues and their identifiers to store the destination addresses and wherein the output means transfers $N_1$ packets from the occupied registers in each of the frame times to $N_2$ output ports indicated by identifiers of the queues, $N_1 \leq N_2 \leq N$.

16. The packet switch as recited in claim 12 further including a register selector for assigning the M of the B registers during each of the frame times to generate M assigned registers.

17. The packet switch as recited in claim 16 further including M header hoppers, coupled to the input means, for storing header information from each of the M input packets in each of the frame times and M addresses of the M assigned registers for the M input packets in each of the frame times.

18. The packet switch as recited in claim 17 further including N queues for storing the addresses of the assigned registers in each of the frame times as transmitted to the N queues from the M header hoppers based upon destination information in the header information of the packets.

19. The packet switch as recited in claim 18 wherein the header hoppers, the register selector, and the queues are coupled via a multi-user bus.

20. The packet switch as recited in claim 12 wherein each of the B registers is a circular shift register.

21. A method for switching M input packets arriving in each frame of a sequence of frame times to N output ports using an M×N packet switch, the method comprising:
switching the M input packets to M of the B outputs to produce M switched packets during each frame of said sequence of frame times, B>M,
storing the M switched packets into M of B registers during each frame of said sequence of frame times to produce M stored packets simultaneously, and
transferring up to N packets from up to N of the B registers in each frame of said sequence of frame times to the output ports simultaneously based upon destination information.

22. The method as recited in claim 21 wherein the transferring includes transferring $N_1$ packets from the B registers in each of the frame times to N2 output ports indicated by identifiers of queues, $N_1 \leq N_2 \leq N$.

23. A method for switching M input packets arriving in each frame of a sequence of frame times to N output ports using an M×N packet switch, the method comprising:
prior to the arrival of the M input packets in each frame of said sequence of frame times, selecting M available registers in a packet buffer having B registers, B>M, to store the M input packets simultaneously arriving in the next frame of said sequence of frame times,
setting up connections in an input module to switch the M input packets to the M available registers,
transmitting the register addresses of the M available registers to header hoppers, delivering and storing the M input packets to the M available registers simultaneously using the connections of the input module,
sending headers from the M input packets to the header hoppers, transmitting the register addresses from the headers of the M input packets to N queues corresponding to destination addresses in the headers of the M input packets simultaneously,
updating the queues based on the header information provided by the header hoppers, sending control information to a register selector to inform the register selector of the destination addresses of the M input packets in each frame of said sequence of frame times,
selecting up to N stored packets from the packet buffer for each of the destination addresses based on contents of the queues,
transmitting the up to N selected stored packets to the outputs simultaneously, updating the register selector to account for any remaining destination addresses for each stored packet, and
transmitting any remaining stored packets to the N outputs in subsequent one or more subsequent frames to clear the remaining stored packets.

24. A method for switching M input packets arriving in each frame of a sequence of frame times to N output ports using an M×N packet switch, the method comprising the steps of:
switching the M input packets to M of the B outputs to produce M switched packets simultaneously during each frame of said sequence of frame times B>M,
storing the M switched packets into M of B registers during each frame of said sequence of frame times to produce M stored packets simultaneously, and
transferring up to N packets from up to N of the B registers in each frame of said sequence of frame times to the output ports simultaneously based upon destination information.

* * * * *